(12) United States Patent
Qiu et al.

(10) Patent No.: US 12,392,612 B2
(45) Date of Patent: Aug. 19, 2025

(54) SYSTEMS AND METHODS FOR EFFECTIVE RELATIVE INTENSITY NOISE SUBTRACTION FOR A BROADBAND RESONATOR OPTICAL GYROSCOPE

(71) Applicant: Honeywell International Inc., Charlotte, NC (US)

(72) Inventors: Tiequn Qiu, Glendale, AZ (US); Jianfeng Wu, Tucson, AZ (US); Glen A. Sanders, Scottsdale, AZ (US); Matthew Wade Puckett, Phoenix, AZ (US); Steven Tin, Edina, MN (US)

(73) Assignee: Honeywell International Inc., Charlotte, NC (US)

( * ) Notice: Subject to any disclaimer, the term of this patent is extended or adjusted under 35 U.S.C. 154(b) by 157 days.

(21) Appl. No.: 18/479,505

(22) Filed: Oct. 2, 2023

(65) Prior Publication Data

US 2025/0109941 A1    Apr. 3, 2025

(51) Int. Cl.
*G01C 19/72*    (2006.01)
*G02B 6/293*    (2006.01)
*H01S 3/067*    (2006.01)

(52) U.S. Cl.
CPC ......... *G01C 19/727* (2013.01); *G01C 19/721* (2013.01); *H01S 3/06791* (2013.01);
(Continued)

(58) Field of Classification Search
CPC . G01C 19/727; G01C 19/721; H01S 3/06791; H01S 3/06795; H01S 2301/02; G02B 6/2934; G02B 6/29347
See application file for complete search history.

(56) References Cited

U.S. PATENT DOCUMENTS 6,204,921 B1    3/2001    Strandjord et al.
8,009,296 B2    8/2011    Sanders et al.
(Continued)

FOREIGN PATENT DOCUMENTS

CN    109282805 A    1/2019
CN    115112111 A    9/2022
(Continued)

OTHER PUBLICATIONS

European Patent Office, "Extended European Search Report", dated Mar. 18, 2025, from EP Application No. 24199190.0, from Foreign Counterpart to U.S. Appl. No. 18/479,505, pp. 1 through 8, Published: EP.
(Continued)

*Primary Examiner* — Thanh Luu
*Assistant Examiner* — Mai Thi Ngoc Tran
(74) *Attorney, Agent, or Firm* — Fogg & Powers LLC

(57) ABSTRACT

A method of operating a resonator optical gyroscope includes generating optical signals having broadband frequency range; coupling optical signals into optical resonator (OR) to propagate in first direction and out of OR after optical signals pass through OR in first direction; applying phase modulation to optical signals coupled out of OR to generate phase-modulated optical signals; filtering first portion of phase-modulated optical signals to generate filtered, phase-modulated optical signals; generating first electrical signals indicative of power level of the filtered, phase-modulated optical signals and RIN; coupling second portion of phase-modulated optical signals into OR to propagate in second direction and out of OR after phase-modulated optical signals pass through the OR in second direction; generating second electrical signals indicative of power level of phase-modulated optical signals after passing through OR in second direction; and determining a rotation
(Continued)

rate based on the first electrical signals and the second electrical signals.

20 Claims, 5 Drawing Sheets

(52) U.S. Cl.
CPC ........ *H01S 3/06795* (2013.01); *G02B 6/2934* (2013.01); *G02B 6/29347* (2013.01); *H01S 2301/02* (2013.01)

(56) References Cited

U.S. PATENT DOCUMENTS

| | | |
|---|---|---|
| 8,068,233 B2 | 11/2011 | Qiu et al. |
| 8,446,590 B2 | 5/2013 | Sanders et al. |
| 8,873,063 B2 | 10/2014 | Sanders et al. |
| 9,207,082 B2 | 12/2015 | Qiu et al. |
| 9,252,559 B2 | 2/2016 | Narayanan et al. |
| 9,568,317 B2 | 2/2017 | Croker et al. |
| 11,131,547 B2 | 9/2021 | Digonnet et al. |
| 2015/0345949 A1 | 12/2015 | Honthaas et al. |
| 2018/0328732 A1* | 11/2018 | Sanders ................ H01S 5/1071 |

FOREIGN PATENT DOCUMENTS

| | | |
|---|---|---|
| CN | 115112113 A | 9/2022 |
| EP | 2333483 B1 | 2/2019 |

OTHER PUBLICATIONS

Liu et al. "Performance of a resonant fiber-optic gyroscope based on a broadband source", Applied Optics, vol. 61, No. 16, Jun. 1, 2022, pp. 4971 through 4979.

Zhang et al., "Angular Random Walk Improvement of Fiber-Optic Gyroscope Using Active Fiber Ring Resonator", Optics Letters, 44(7): 1793-1796, Apr. 2019, pp. 1 through 5.

Zhang et al., "Fiber optic gyroscope noise reduction with fiber ring resonator", Applied Optics, Sep. 2018, vol. 57, No. 25, published Aug. 31, 2018, pp. 7391 through 7397.

Zhao et al., "Navigation-grade resonant fiber-optic gyroscope using ultra-simple white-light multi-beam interferometry", Photonics Research, Feb. 2022, vol. 10, No. 2, posted Dec. 21, 2021, pp. 542 through 549.

Liu et al., "Reduction of relative intensity noise in a broadband source-driven RFOG using a high-frequency modulation technique", Optics Letters, Oct. 2022, vol. 47, No. 19, published Sep. 27, 2022, pp. 5100 through 5103.

* cited by examiner

SYSTEMS AND METHODS FOR EFFECTIVE RELATIVE INTENSITY NOISE SUBTRACTION FOR A BROADBAND RESONATOR OPTICAL GYROSCOPE

BACKGROUND

Resonator fiber optic gyroscopes (RFOGs) typically utilize narrow linewidth laser sources to generate the optical signals necessary for rotation rate measurements. An RFOG generally operates by propagating the optical signals generated by the laser through an optical resonator in counter-propagating directions. The resonance frequencies of the optical resonator are frequency-shifted due to the Sagnac effect when the RFOG experiences a rotation about its sense axis. The frequency shift of the resonance frequencies can then be used to determine the extent of rotation experienced by the RFOG.

SUMMARY

In some aspects, a resonator optical gyroscope includes a broadband light source configured to generate optical signals having a broadband frequency range and an optical resonator. The resonator optical gyroscope further includes a first optical coupler configured to receive the optical signals from the broadband light source and couple the optical signals into the optical resonator such that the optical signals propagate in a first direction through the optical resonator. The resonator optical gyroscope further includes a second optical coupler coupled to the optical resonator, wherein the second optical coupler is configured to couple optical signals out of the optical resonator after the optical signals pass through the optical resonator in the first direction. The resonator optical gyroscope further includes a phase modulator configured to apply a phase modulation to optical signals that have been coupled out of the optical resonator by the second optical coupler to generate phase-modulated optical signals. The resonator optical gyroscope further includes an optical filter configured to filter a first portion of the phase-modulated optical signals to generate filtered, phase-modulated optical signals. The second optical coupler is configured to couple a second portion of the phase-modulated optical signals into the optical resonator such that the phase-modulated optical signals propagate in a second direction through the optical resonator. The first optical coupler is configured to couple the second portion of the phase-modulated optical signals out of the optical resonator after the phase-modulated optical signals pass through the optical resonator in the second direction. The resonator optical gyroscope further includes a relative intensity noise detector configured to convert the filtered, phase-modulated optical signals to first electrical signals indicative of a power level of the filtered, phase-modulated optical signals and relative intensity noise. The resonator optical gyroscope further includes a second photodetector configured to convert the phase-modulated optical signals to second electrical signals indicative of a power level of the phase-modulated optical signals after passing through the optical resonator in the second direction. The resonator optical gyroscope further includes one or more circuits configured to determine a rate of rotation based on the first electrical signals and the second electrical signals.

In some aspects, a resonator optical gyroscope includes a broadband light source configured to generate optical signals having a broadband frequency range and an optical resonator. The resonator optical gyroscope further includes a first optical coupler configured to receive the optical signals from the broadband light source and couple the optical signals into the optical resonator such that the optical signals propagate in a first direction through the optical resonator. The resonator optical gyroscope further includes a second optical coupler coupled to the optical resonator, wherein the second optical coupler is configured to couple optical signals out of the optical resonator after the optical signals pass through the optical resonator in the first direction. The resonator optical gyroscope further includes a phase modulator configured to apply a phase modulation to optical signals that have been coupled out of the optical resonator by the second optical coupler to generate phase-modulated optical signals. The resonator optical gyroscope further includes an optical resonator filter configured to filter a first portion of the phase-modulated optical signals to generate filtered, phase-modulated optical signals. The second optical coupler is configured to couple a second portion of the phase-modulated optical signals into the optical resonator such that the phase-modulated optical signals propagate in a second direction through the optical resonator. The first optical coupler is configured to couple the phase-modulated optical signals out of the optical resonator after the phase-modulated optical signals pass through the optical resonator in the second direction. The resonator optical gyroscope further includes a relative intensity noise detector configured to convert the filtered, phase-modulated optical signals to first electrical signals indicative of a power level of the filtered, phase-modulated optical signals and relative intensity noise. The resonator optical gyroscope further includes a second photodetector configured to convert the phase-modulated optical signals after passing through the optical resonator in the second direction to second electrical signals indicative of a power level of the phase-modulated optical signals. The resonator optical gyroscope further includes one or more circuits configured to determine a rate of rotation based on the first electrical signals and the second electrical signals.

In some aspects, a method of operating a resonator optical gyroscope includes generating, with a broadband light source, optical signals having a broadband frequency range. The method further includes coupling, with a first optical coupler, the optical signals into an optical resonator to propagate in a first direction. The method further includes coupling, with a second optical coupler, the optical signals out of the optical resonator after the optical signals pass through the optical resonator in the first direction. The method further includes applying a phase modulation to the optical signals coupled out of the optical resonator by the second optical coupler to generate phase-modulated optical signals. The method further includes filtering, with an optical filter, a first portion of the phase-modulated optical signals to generate filtered, phase-modulated optical signals. The method further includes generating, with a relative intensity noise detector, first electrical signals indicative of a power level of the filtered, phase-modulated optical signals and relative intensity noise. The method further includes coupling, with the second optical coupler, a second portion of the phase-modulated optical signals into the optical resonator to propagate in a second direction. The method further includes coupling, with the first optical coupler, the phase-modulated optical signals out of the optical resonator after the phase-modulated optical signals pass through the optical resonator in the second direction. The method further includes generating, with a second photodetector, second electrical signals indicative of a power level of the phase-modulated optical signals after passing through the optical resonator in the second direction. The method further includes determining a rotation rate based on the first electrical signals and the second electrical signals.

BRIEF DESCRIPTION OF THE DRAWINGS

Understanding that the drawings depict only some embodiments and are not therefore to be considered limiting in scope, the exemplary embodiments will be described with additional specificity and detail using the accompanying drawings, in which.

Figure 1:
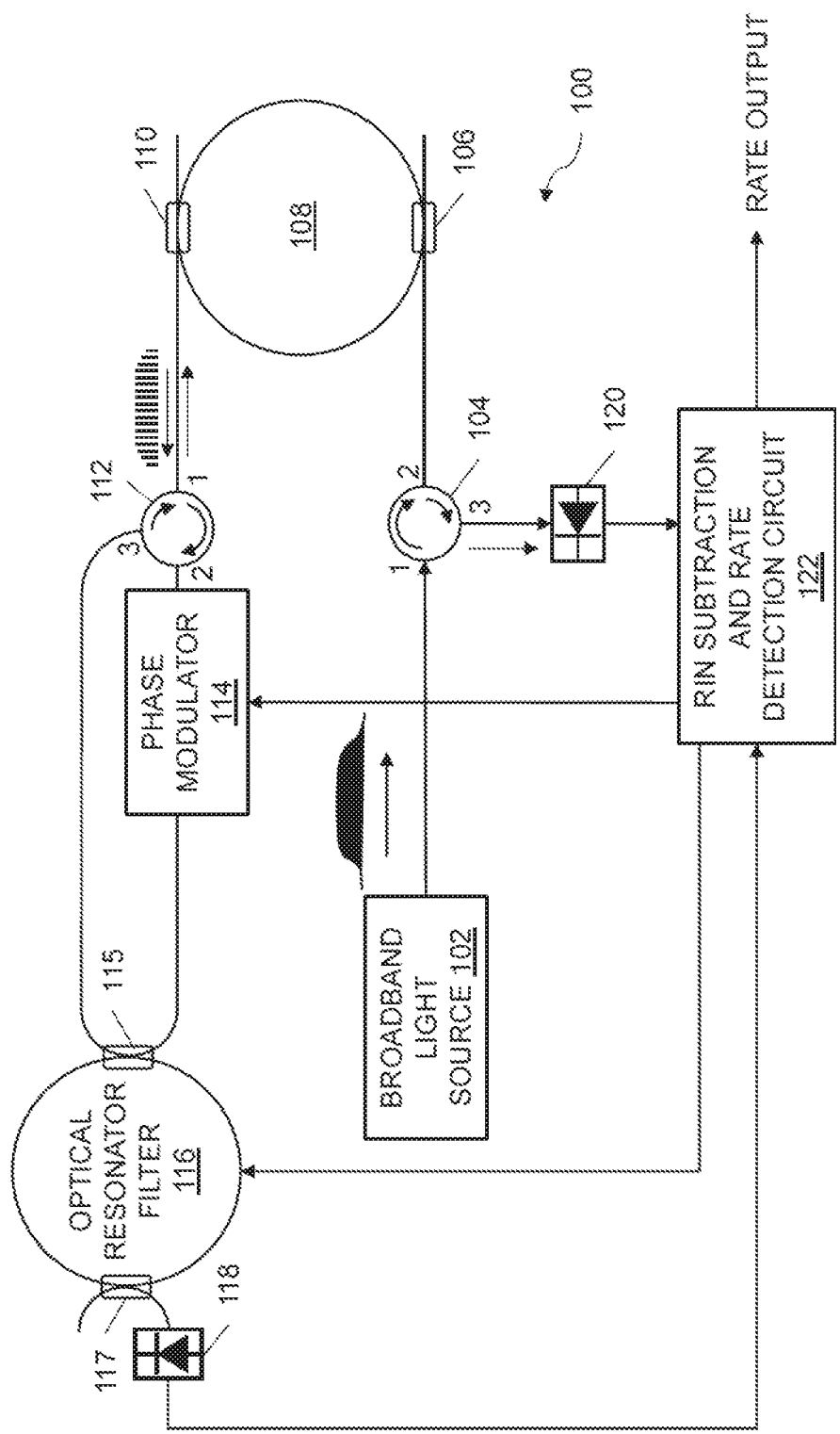
FIG. 1 is a block diagram of an example system.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which are shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

RFOGs using a broadband light source have recently emerged as a potential apparatus for rotation rate sensing with reduced fiber length, simpler configurations, and potential competitive performance. However, RFOGs using a broadband light source have an issue related to the broadband light source spectrum being significantly filtered by the resonator such that the relative intensity noise at the rate detector is much higher than would be experienced with an interferometer fiber optical gyroscope (IFOG).

One potential option to reduce the relative intensity noise is to measure the relative intensity noise of the optical signals at some point in the optical path after the optical signals pass through the optical resonator and phase modulation is applied. The measured relative intensity noise is then subtracted from the electrical signal generated from the rate photodetector for the rate output of the optical resonator gyroscope. However, a problem with this approach is that the optical spectrum at the rate detector is substantially different from the optical spectrum at other points in the optical path of the optical resonator gyroscope due to the filtering of optical signals by the optical resonator. The light that reaches the rate detector passes through the optical resonator twice while the light that reaches the RIN subtraction detector only passes through the optical resonator once. The mismatch of optical spectrum renders simple relative noise intensity subtraction techniques ineffective.

The techniques described herein address the issue of relative intensity noise by utilizing an optical filter at a particular position in the optical path, which modifies the spectrum of the optical signals sampled to generate electrical signals for relative intensity noise subtraction to have an optical spectrum that more closely aligns to the optical spectrum of the phase-modulated optical signals sampled for rate detection. In some examples, the optical filter is adjusted or tuned using a servo in order to better match the optical spectrums over time. The techniques described herein improve the relative intensity noise subtraction and lead to more accurate rate detection performance for the resonator optical gyroscope utilizing a broadband light source.

FIG. 1 illustrates a block diagram of an example resonator optical gyroscope 100 in which the techniques for effective relative intensity noise subtraction can be implemented. In the example shown in FIG. 1, the resonator optical gyroscope 100 includes various components, including a broadband light source 102, first circulator 104, first optical coupler 106, optical resonator 108, second optical coupler 110, second circulator 112, phase modulator 114, optical filter 116, relative intensity noise (RIN) detector 118, rate photodetector 120, and a RIN subtraction and rate detection circuit 122. Although not specifically labelled in FIG. 1, the components of the resonator optical gyroscope 100 are coupled via suitable guided optics. For example, the components of the resonator optical gyroscope 100 can be coupled via optical waveguides and/or free space optics such as lenses, mirrors, and beam splitters. In some examples, the resonator optical gyroscope 100 is implemented on an integrated photonics substrate, such as a photonics chip.

The resonator optical gyroscope 100 generally operates by propagating optical signals through different optical pathways, where they are ultimately processed to determine a rotation rate experienced by the RIN subtraction and rate detection circuit 122 of the resonator optical gyroscope 100.

The broadband light source 102 is configured to generate the optical signals with a broadband frequency range. In some examples, the broadband light source 102 is configured to generate optical signals via amplified spontaneous emission (ASE). In some examples, the broadband light source 102 is a rare-earth doped fiber or other waveguide light source. For example, the broadband light source 102 can be a fiber doped with rare-earth ions such as erbium, ytterbium, or the like. In such examples, the broadband light source 102 is optically pumped (for example, using a 980 nm or 1480 nm pump lasers), absorbs the pump light, and emits the optical signals. In some examples, the broadband light source 102 can be a superluminescent laser diode, light emitting diode (LED), or the like. In any case, the optical signals generated by broadband light source 102 have a continuous broadband optical spectrum and low coherence that reduces the effects from the optical Kerr effect or renders such effects negligible.

In the example shown in FIG. 1, the optical signals generated by the broadband light source 102 are provided to a first circulator 104. In the example shown in FIG. 1, the first circulator 104 is a three-port device configured to output signals received at one port to another particular port. In the example shown in FIG. 1, optical signals received from the broadband light source 102 at a first port (shown as port 1 of the first circulator 104) are output to a second port (shown as port 2 of the first circulator 104) coupled to the first optical coupler 106. In the example shown in FIG. 1, optical signals received from the first optical coupler 106 at the second port are output to a third port (shown as port 3 of the first circulator 104) and then to the rate photodetector 120.

The first circulator 104 is configured to provide the optical signals received from the broadband light source 102 to the first optical coupler 106, and the first optical coupler 106 is configured to couple at least a portion of the optical signals into the optical resonator 108. In some examples, the fiber extending past the first optical coupler 106 is angle cleaved in order to prevent back reflection of the portion of the optical signals that are not transmitted into the optical resonator 108. In other examples, an optical isolator or a similar device could also be used to prevent back reflection. In any case, the prevention of back reflection ensures that these signals do not interfere with the other signals that are received by the rate photodetector 120 (including the optical signals generated by broadband light source 102 and the phase-modulated optical signals, as further described herein).

The optical resonator 108 is configured to pass a portion of the coupled optical signals at one or more resonance frequencies of the optical resonator 108. When the first optical coupler 106 receives the optical signals from the first circulator 104, it directs the optical signals to propagate in a first direction in the optical resonator 108. In the example shown in FIG. 1, the optical signals coupled into the optical resonator 108 by the first optical coupler 106 propagate in the counterclockwise (CCW) direction; however, in other examples the resonator optical gyroscope 100 can be designed such that the optical signals propagate initially in the clockwise (CW) direction. As the optical signals propagate in the optical resonator 108, some frequency components of the optical signals (particularly frequency components that are not near the resonance frequency of the optical resonator 108) will interfere destructively and not resonate. Thus, the frequency components of the optical signals that correspond to the resonance frequencies of the optical resonator 108 will get transmitted to the output port (second optical coupler 110), while other frequency components will not.

After propagating through the optical resonator 108, a portion of the optical signals are coupled out of the optical resonator 108 via a second optical coupler 110. The optical filtering of the optical signals in the first passage through the optical resonator 108 reshapes the broadband optical spectrum to match the optical resonator transmission lines. As shown in FIG. 1, the optical signals coupled out of the optical resonator 108 have a significantly reduced power level and are channelized by the multiple resonances in the CCW direction.

The optical signals coupled out of the optical resonator 108 via the second optical coupler 110 are then sent to a second circulator 112. In the example shown in FIG. 1, the second circulator 112 is a three-port device configured to output signals received at one port to another particular port. In the example shown in FIG. 1, optical signals received from the second optical coupler 110 at a first port (shown as port 1 of the second circulator 112) are output to a second port (shown as port 2 of second circulator 112) coupled to the phase modulator 114. In the example shown in FIG. 1, optical signals received from the phase modulator 114 at a third port (shown as port 3 of the second circulator 112) are output to the first port and then to the second optical coupler 110.

In the example shown in FIG. 1, the optical signals output from port 2 of the second circulator 112 are provided to a phase modulator 114. The phase modulator 114 is configured to modulate the phase of the optical signals based on a phase modulation signal that is sent to the phase modulator 114 from the RIN subtraction and rate detection circuit 122. In some examples, the phase modulator 114 is configured to generate phase-modulated optical signals using a sawtooth waveform. In some examples, the phase modulator 114 is an electro-optic phase modulator.

Once modulated by phase modulator 114, the modulated optical signals (referred to as "phase-modulated optical signals") are sent back to the optical resonator 108 in the reverse direction through the second circulator 112 and the second optical coupler 110. After modulation, the phase-modulated optical signals are provided to the third port of the second circulator 112. The phase-modulated optical signals received at the third port of the second circulator 112 are output to the first port of the second circulator 112, which then passes the phase-modulated optical signals back to the second optical coupler 110. The second optical coupler 110 is configured to couple at least a portion of the phase-modulated optical signals into the optical resonator 108.

While some of the signal intensity is coupled into the optical resonator 108, a residual amount of signal propagates toward the fiber extending past the second optical coupler 110. In some examples, the fiber extending past the second optical coupler 110 is angle cleaved in order to prevent back reflection of the portion of the phase-modulated optical signals that are not transmitted into the optical resonator 108. In other examples, an optical isolator or a similar device could also be used to prevent back reflection. In any case, the prevention of back reflection ensures that these signals do not interfere with the other signals that are received by the second optical coupler 110.

The second optical coupler 110 couples the phase-modulated optical signals in a second direction through the optical resonator 108. In the example shown in FIG. 1, the phase-modulated optical signals propagate in the CW direction. The phase-modulated optical signals with frequency components corresponding to a resonance peak of the optical resonator 108 propagate through the optical resonator 108, while non-resonance frequency components are rejected.

After the phase-modulated optical signals propagate through the optical resonator 108, the first optical coupler 106 is configured to couple a portion of the phase-modulated optical signals out of the optical resonator 108, and the phase-modulated optical signals are directed to the first circulator 104. Since the phase-modulated optical signals are propagating in a direction towards the broadband light source 102 and received at the second port of the first circulator 104, the first circulator 104 acts as an isolator to direct the phase-modulated optical signals to the rate photodetector 120 and prevent the phase-modulated optical signals from propagating back to the broadband light source 102.

The phase-modulated optical signals propagate from the first circulator 104 to the rate photodetector 120. The rate photodetector 120 is configured to convert the phase-modulated optical signals from an optical signal to a corresponding electrical signal, based on the power of the received phase-modulated optical signals. The electrical signal corresponding to the phase-modulated optical signals is then provided to a RIN subtraction and rate detection circuit 122.

Figure 2:
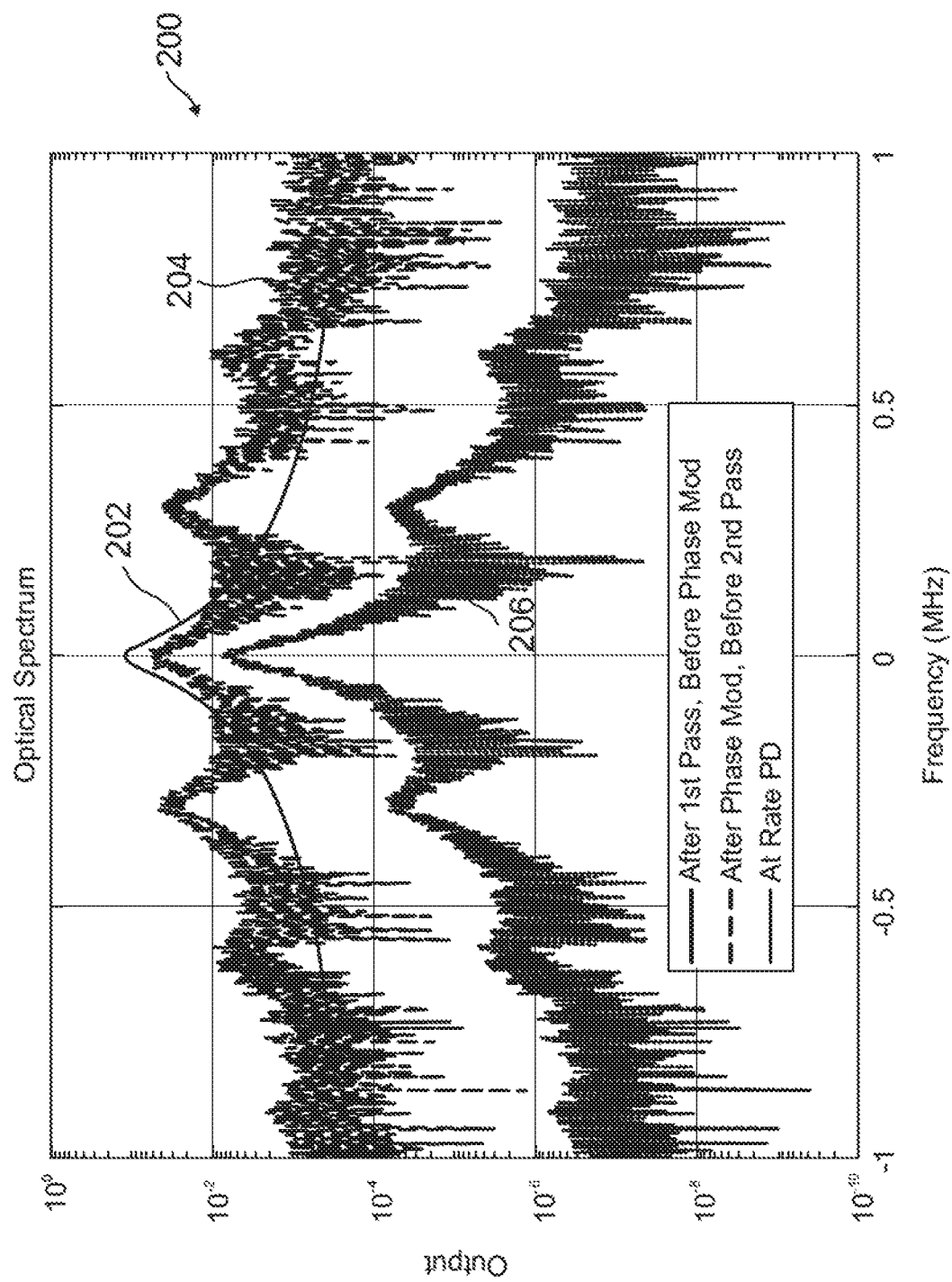
FIG. 2 is a diagram of an optical spectrum of optical signals at different stages in an example optical gyroscope.

The optical spectrum of the optical signals generated from the broadband light source 102 vary significantly after the optical signals pass through the optical resonator 108 and have phase modulation applied. FIG. 2 is a diagram 200 of the optical spectrum of the optical signals for a single resonance at various stages of the optical path for the resonator optical gyroscope 100. In the example shown in FIG. 2, the line 202 represents the optical spectrum of the optical signals after passing through the optical resonator 108 in the first direction and before phase modulation is applied using the phase modulator 114. As can be seen in FIG. 2, the optical spectrum of the optical signals is quite defined after passage through the optical resonator 108, which is described above as the filtering/channelizing effect of the optical resonator 108.

In the example shown in FIG. 2, the line 204 represents the optical spectrum of the phase-modulated optical signals prior to being coupled back into the optical resonator 108 in the second direction by the second optical coupler 110. In the example shown in FIG. 2, the peaking shown in the line 204 representing the optical spectrum of the phase-modulated optical signals corresponds to the sidebands of the optical waves after phase modulation is applied using the phase modulator 114.

In the example shown in FIG. 2, the line 206 represents the optical spectrum of the phase-modulated optical signals provided to the rate photodetector 120 after passing through the optical resonator 108 in the second direction. As can be seen in FIG. 2, the power level of the resonance peak for the phase-modulated optical signals provided to the rate photodetector 120 is reduced compared to the power level of the phase-modulated optical signals prior to passage through the optical resonator 108 in the second direction. Further, the power level of the sidebands for the phase-modulated optical signals provided to the rate photodetector 120 is significantly reduced compared to the power level of the sidebands of the phase-modulated optical signals prior to passage through the optical resonator 108 in the second direction.

Due to the mismatch in the optical spectrums represented by lines 204, 206 in FIG. 2, current techniques for relative intensity noise subtraction are insufficient to adequately reduce the relative intensity noise.

In the example shown in FIG. 1, the resonator optical gyroscope 100 further includes an optical filter 116 optically coupled between the phase modulator 114 and the port 3 of the second circulator 112 in order to provide more effective relative intensity noise subtraction. In the example shown in FIG. 1, a third optical coupler 115 is configured to couple at least a portion of the phase-modulated optical signals into the optical filter 116. In some examples, the phase-modulated optical signals pass through the optical filter 116 in a direction as that is the same as the first direction of the optical resonator 108. In the example shown in FIG. 1, the phase-modulated optical signals pass through the optical filter 116 in the CCW direction. The optical filter 116 transmits the phase-modulated optical signals and generates filtered, phase-modulated optical signals. The optical filtering of the optical signals in the passage through the optical filter 116 reshapes the broadband optical spectrum to match the optical filtering effect of the optical resonator 108 in the second passage through the optical resonator 108.

The optical filter 116 is configured to filter the phase-modulated optical signals such that the optical spectrum of the phase-modulated optical signals used for relative intensity noise subtraction approximately matches the optical spectrum of the phase-modulated optical signals provided to the rate photodetector 120. In the example shown in FIG. 1, the optical filter 116 is an optical resonator filter and the description below is based on this example. However, it should be understood that other types of optical filters could also be used as long as the optical filter has characteristics similar to those described below.

After propagating through the optical filter 116, a portion of the filtered, phase-modulated optical signals is coupled out of the optical filter 116 via a fourth optical coupler 117. The filtered, phase-modulated optical signals coupled out of the optical filter 116 via the fourth optical coupler 117 are provided to the RIN detector 118. In some examples, RIN detector 118 is configured to measure the intensity fluctuation of the filtered, phase-modulated optical signals at the phase modulation frequency. In some examples, the RIN detector 118 is configured to measure direct current (DC) power and noise for the filtered, phase-modulated optical signals. In some examples, the RIN detector 118 is configured to convert the filtered, phase-modulated optical signals from an optical signal to a corresponding electrical signal, based on the power of the received phase-modulated optical signals and relative intensity noise. In some examples, the RIN detector 118 is configured to output electrical signals indicative of the power level and the relative intensity noise at the modulation frequency of the filtered, phase-modulated optical signals and provide the electrical signals to the RIN subtraction and rate detection circuit 122.

In some examples, the optical filter 116 is designed to have a cavity that is a similar size to the cavity of the optical resonator 108. In other examples, the optical filter 116 is designed to have a cavity that is smaller than the cavity of the optical resonator 108 and a higher finesse than the optical resonator 108. As long as the optical transmission spectrum of the optical filter 116 for the filtered, phase-modulated optical signals approximately matches the optical transmission line shape of the optical resonator 108 for the phase-modulated optical signals, the optical filter 116 can differ from the optical resonator 108 in these or other ways.

Figure 3A:
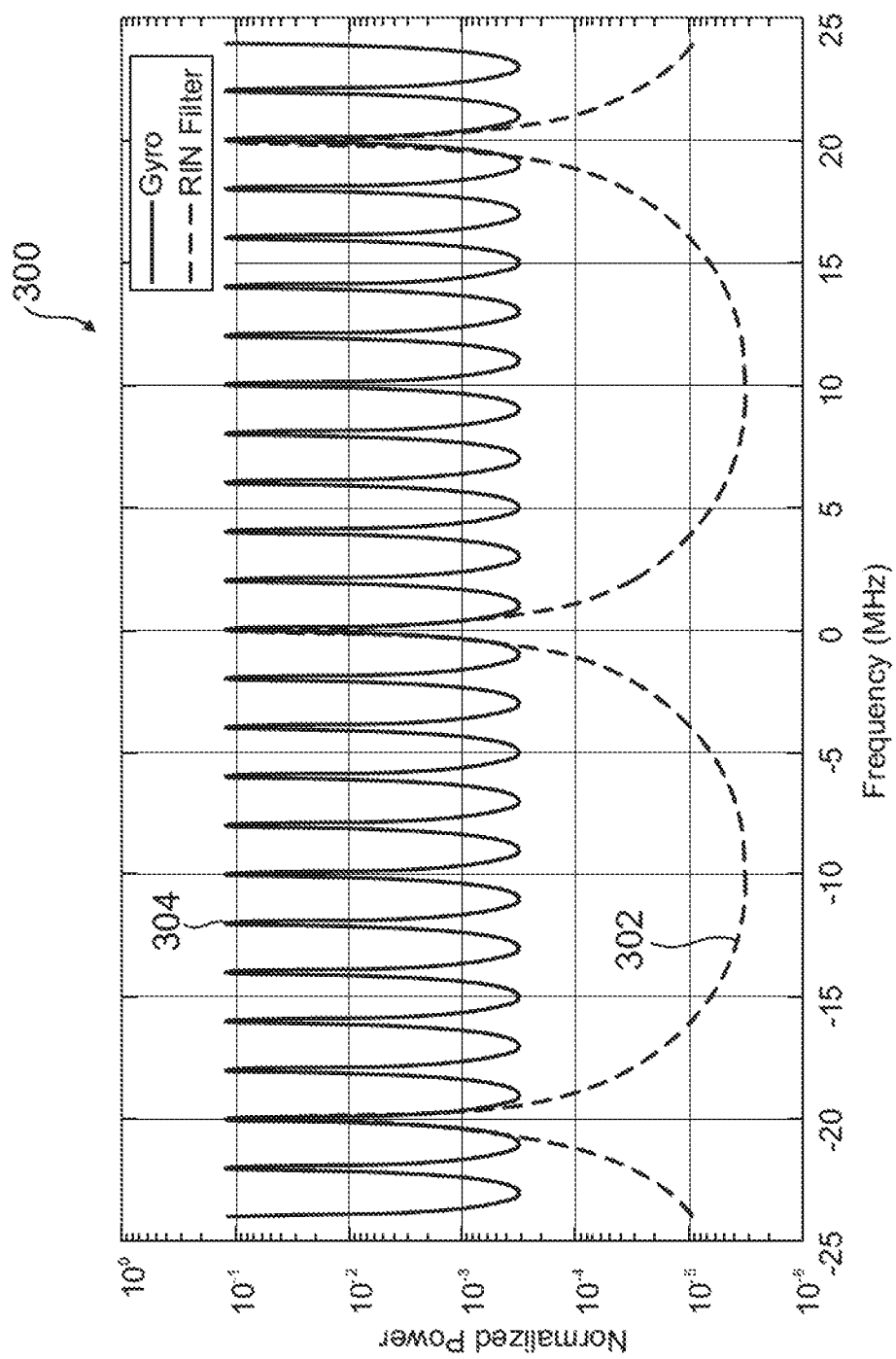
FIG. 3A is a diagram of transmission spectrum of a resonator optical gyroscope and an optical filter.

In some examples, the optical filter 116 is designed to have a free spectral range (FSR) that is an integer number (n=1, 2, 3, . . . ) of the FSR of the optical resonator 108. FIG. 3A illustrates an optical transmission spectrum 302 of the optical filter 116 and an optical transmission spectrum 304 of the optical resonator 108 where the integer ratio of the FSR of the optical filter 116 to the FSR of the optical resonator 108 is n=10. It should be understood that this is an example and any integer ratio of the FSR of the optical filter 116 to the FSR of the optical resonator 108 of one or greater could be implemented for the resonator optical gyroscope 100.

Figure 3B:
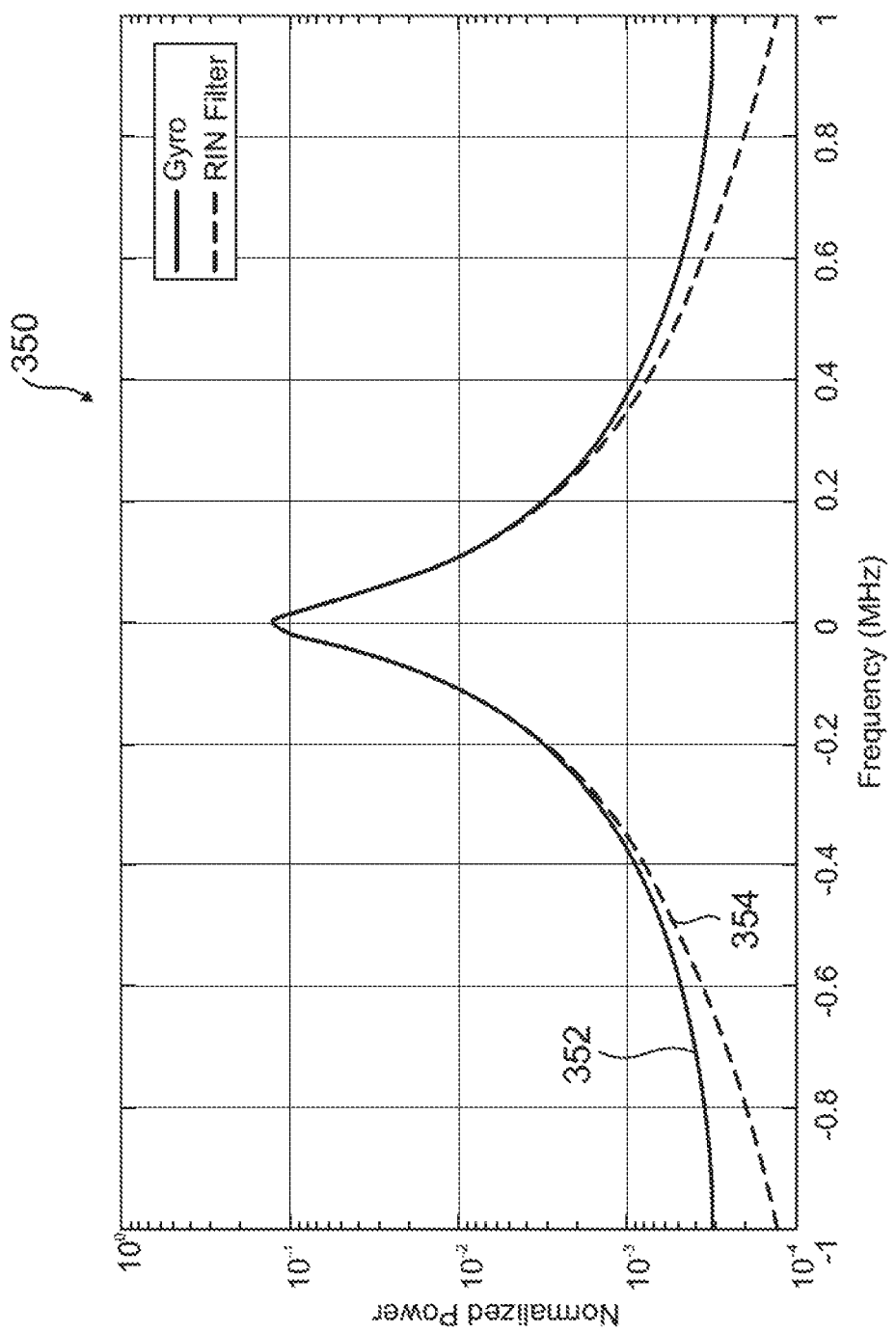
FIG. 3B is a diagram of transmission spectrum of a resonator optical gyroscope and an optical filter.

In some examples, the optical filter 116 is designed such that the line shape of the optical filter 116 is approximately equal to the line shape of the optical resonator 108. FIG. 3B is a diagram 350 of the optical transmission spectrum 352 of the optical resonator 108 and the optical transmission spectrum 354 of the optical filter 116 for a resonance peak (for example, the central resonance peak shown in FIG. 3A). In some examples, the line shape of the optical filter 116 is considered to be approximately equal to the line shape of the optical resonator 108 if the line shape of the optical transmission spectrum 354 of the optical filter 116 overlaps ninety-five percent or more with the optical transmission spectrum 352 of the optical resonator 108 within an order of magnitude of the resonance peak. In the example shown in FIG. 3B, the line shape of the optical transmission spectrum 354 of the optical filter 116 matches the optical transmission spectrum 352 of the optical resonator 108 above −20 dB. The deviations below −20 dB shown in FIGS. 3A-3B do not contribute much to relative intensity noise difference, so it is more important (and efficient) to match the top portion of the resonance peaks.

The RIN subtraction and rate detection circuit 122 is configured to subtract the electrical signals received from the RIN detector 118 from the electrical signals received from the rate photodetector 120 to remove relative intensity noise from the electrical signals received from the rate photodetector 120.

In some examples, the electrical signals from the RIN detector 118 and/or the electrical signals from the rate photodetector 120 are modified prior to subtraction. In some such examples, the gain of the electrical signals from the RIN detector 118 and/or the gain of the electrical signals from the rate photodetector 120 is modified to equalize the power levels of the electrical signals prior to subtraction. The difference between or a ratio of direct current (DC) power levels between the electrical signals from the RIN detector 118 and the electrical signals from the rate photodetector 120 can be used to determine the gain adjustment to apply to the electrical signals from the RIN detector 118 and/or the electrical signals from the rate photodetector 120.

In order to determine the rotation rate, the RIN subtraction and rate detection circuit 122 is configured to demodulate the electrical signals from the rate photodetector 120 after subtraction of the relative intensity noise using the electrical signals from the RIN detector 118 and further configured to determine the resonance frequency shift based on the power of the demodulated signal corresponding to the phase-modulated optical signals. For example, the received electrical signals from the rate photodetector 120 can be indicative of a power difference corresponding to a change in rotation rate.

In some examples, in order to better match the optical spectrum of the filtered, phase-modulated optical signals coupled out of the optical filter 116 and the optical spectrum of the phase-modulated optical signals coupled out of the optical resonator 108, the optical filter 116 is locked to the optical resonator 108 so the optical filter 116 does not drift from the optical resonator 108 over time. In some examples, the RIN subtraction and rate detection circuit 122 or another circuit is configured to adjust at least one characteristic of the optical filter 116 to lock the optical filter 116 to the optical resonator 108. In some examples, the RIN subtraction and rate detection circuit 122 or another circuit is configured to adjust a temperature of the optical filter 116. In other examples, the RIN subtraction and rate detection circuit 122 or another circuit is configured to modify a length of the optical filter 116 (for example, using a piezoelectric transducer). In some examples, the RIN subtraction and rate detection circuit 122 is configured to lock the optical filter 116 to the optical resonator 108 by maximizing a direct current power level output by the RIN detector 118.

In some examples, the power level of the phase-modulated optical signals can also be used to adjust the slope of the triangle phase modulation signal (which shifts the frequency of the optical signals), and the slope difference between two successive periods of the phase modulation signal (which apply a square wave frequency modulation to the optical signals) can be used to determine the frequency shift. The RIN subtraction and rate detection circuit 122 can then determine the rotation rate based on the frequency shift.

In some examples, the resonator optical gyroscope 100 shown in FIG. 1 is configured to operate as a closed-loop optical gyroscope because the output from the rate photodetector 120, indicative of a rotation rate, is also used as feedback to adjust the operation of the phase modulator 114 (wherein the "closed-loop" comprises the propagation of signals from the phase modulator 114 to, ultimately, the RIN subtraction and rate detection circuit 122, and the control signals input to the phase modulator 114). In some examples, the RIN subtraction and rate detection circuit 122 includes control circuitry configured to adjust the operation of phase modulator 114 based on the electrical signal from the rate photodetector 120. In some examples, the RIN subtraction and rate detection circuit 122 configures at least one parameter of the phase modulator 114, such as the characteristics of the phase modulation signal used by the phase modulator 114 to modulate the optical signals. For example, as previously described, the RIN subtraction and rate detection circuit 122 is configured to adjust the slope(s) of a sawtooth phase modulation signal based on a rotation induced changes determined from the received electrical signal. The RIN subtraction and rate detection circuit 122 can send control signals that configure the phase modulator 114.

In response to receiving the control signals to adjust the slope of the phase modulation signal, the phase modulator 114 generates an adjusted phase modulation signal with the slope of the waveform corresponding to the parameters set by the RIN subtraction and rate detection circuit 122. For example, the phase-modulated optical signals can have a frequency shift that corresponds to the shifted resonance frequency of the optical resonator 108 due to rotation. In this way, the resonator optical gyroscope 100 (and in particular the RIN subtraction and rate detection circuit 122) can compensate for power fluctuations in the average power of phase-modulated optical signals that are detected by the RIN subtraction and rate detection circuit 122.

In some examples, to reduce the rate measurement error, the optical resonator 108 can include polarizers (not shown) configured to filter out portions of the optical signals that correspond to undesirable polarization states. For example, the optical resonator 108 can include a polarizer (not shown) configured to filter out portions of the optical signals that correspond to unwanted polarization modes of the optical resonator 108. As a result, only the portion of the optical signals that correspond to a selected polarization mode of the optical resonator 108 are allowed to pass through the polarizer, and will get transmitted through each round trip through the optical resonator 108.

Figure 4:
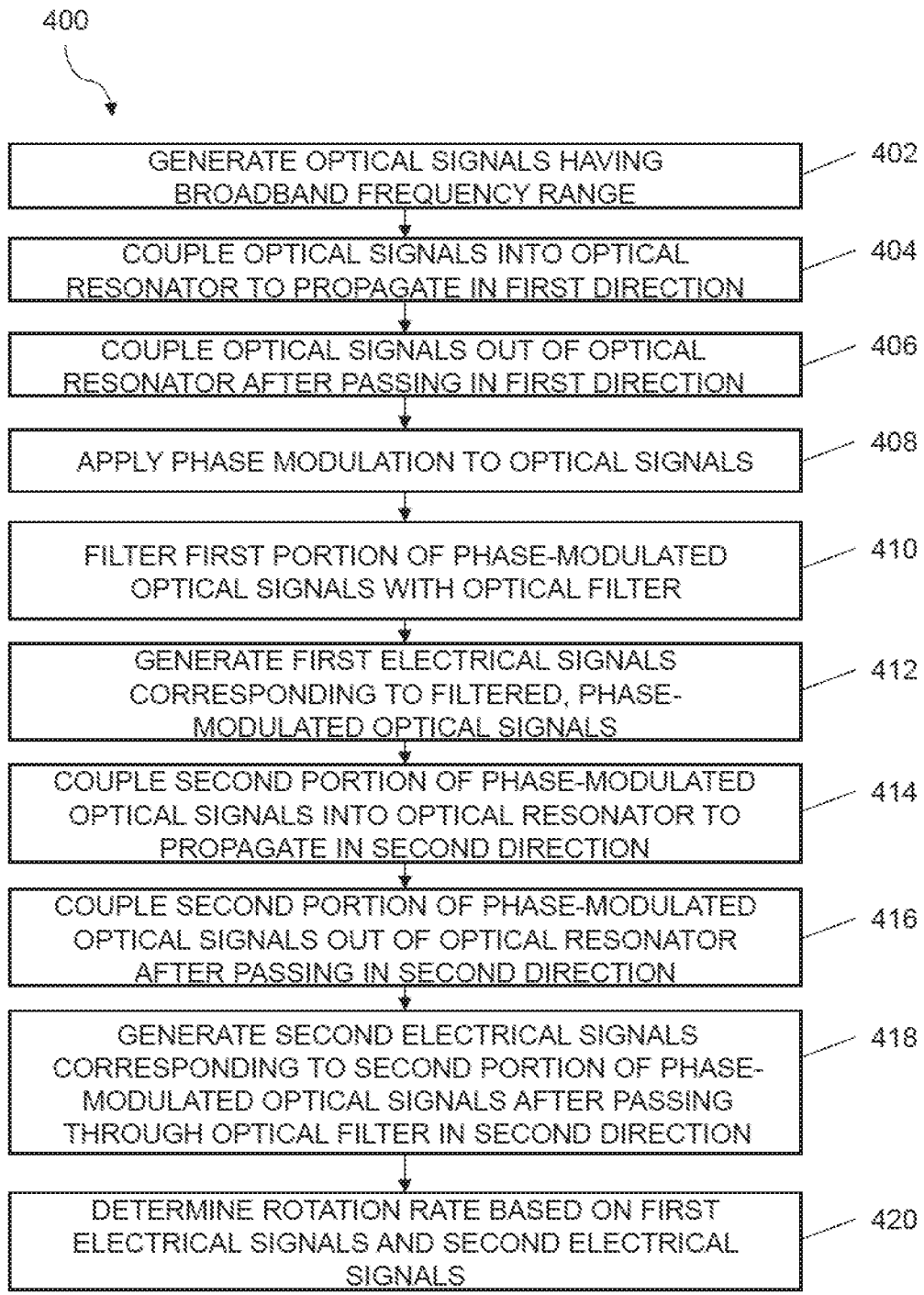
FIG. 4 is a flow diagram of an example method of relative intensity noise subtraction for a resonator optical gyroscope.

FIG. 4 illustrates a flow diagram of an example method 400 of operation of a resonator optical gyroscope. The common features discussed above with respect to the example system in FIGS. 1-3B can include similar characteristics to those discussed with respect to method 400 and vice versa. In some examples, the blocks of the method 400 are performed by resonator optical gyroscope 100 described above.

The method 400 includes generating optical signals having a broadband frequency range (block 402). In some examples, the optical signals are generated using a broadband light source, which can be an ASE light source, rare-earth doped fiber light source, superluminescent laser diode, a light emitting diode, or the like.

The method 400 further includes coupling the optical signals into an optical resonator to propagate in a first direction (block 404), and coupling the optical signals out of the optical resonator after the optical signals have completed pass(es) through the optical resonator in the first direction (block 406). In some examples, the optical signals are coupled into the optical resonator and out of the optical resonator using a first optical coupler and a second optical coupler, respectively.

The method 400 further includes applying a phase modulation to the optical signals (block 408). In some examples, applying a phase modulation to the optical signals includes using a sawtooth waveform.

The method 400 further includes filtering a first portion of the phase-modulated optical signals with an optical filter (block 410). In some examples, the filtering is performed using an optical filter (for example, an optical resonator filter). In some examples, the optical filter is designed to have a free spectral range that is an integer multiple of the free spectral range of the optical resonator, and such that a line shape of resonance peaks of optical signals output from the optical filter match the line shape of resonance peaks of optical signals output from the optical resonator. In some examples, the optical filter is locked to the optical resonator by adjusting one or more characteristics of the optical filter.

The method 400 further includes generating electrical signals corresponding to the filtered, phase-modulated optical signals (block 412). In some examples, the electrical signals are generated by a relative intensity noise detector and indicative of a power level of the filtered, phase-modulated optical signals and relative intensity noise.

The method 400 further includes coupling a second portion of the phase-modulated optical signals into the optical resonator to propagate in a second direction (block 414), and coupling the phase-modulated optical signals out of the optical resonator after the optical signals have passed through the optical resonator in the second direction (block 416). In some examples, the phase-modulated optical signals are coupled into the optical resonator and out of the optical resonator using the second optical coupler and the first optical coupler, respectively.

The method 400 further includes generating second electrical signals corresponding to the phase-modulated optical signals after passing through the resonator in the second direction (block 418). In some examples, the electrical signals are generated by a photodetector and indicative of a power level of the phase-modulated optical signals.

The method 400 further includes determining a rotation rate based on the first electrical signals and the second electrical signals (block 420). In some examples, determining the rotation rate based on the first electrical signals and the second electrical signals includes subtracting the first electrical signals from the second electrical signals. In some such examples, determining the rotation rate based on the first electrical signals and the second electrical signals includes adjusting the gain of the first electrical signals and/or the second electrical signals prior to the subtraction. In some examples, determining the rotation rate includes demodulating the electrical signals and determining a resonance frequency shift based on the power of the demodulated electrical signal corresponding to the phase-modulated optical signal.

By using an optical filter to filter a portion of the phase-modulated optical signals as described herein, relative intensity noise subtraction for a broadband RFOG can be performed in an effective and efficient manner. Further, by designing the optical filter and locking it to the optical resonator as described herein, the optical filter can be more compact and effective for relative intensity noise subtraction. Overall, the systems and methods described herein can substantially reduce the relative intensity noise induced rate error for a broadband RFOG such that higher performance can be achieved with low cost.

In various aspects, system elements, method steps, or examples described throughout this disclosure (such as the RIN subtraction and rate detection circuit 122, or components thereof, for example) may be implemented on one or more computer systems including a central processing unit (CPU), graphics processing unit (GPU), field programmable gate array (FPGA), application specific integrated circuit (ASIC) and/or similar devices comprising hardware executing code to realize those elements, processes, or examples, said code stored on a non-transient data storage device. These devices include or function with software programs, firmware, or other computer readable instructions for carrying out various methods, process tasks, calculations, and control functions.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented, in part, in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a resonator optical gyroscope, comprising: a broadband light source configured to generate optical signals having a broadband frequency range; an optical resonator; a first optical coupler configured to receive the optical signals from the broadband light source and couple the optical signals into the optical resonator such that the optical signals propagate in a first direction through the optical resonator; a second optical coupler coupled to the optical resonator, wherein the second optical coupler is configured to couple optical signals out of the optical resonator after the optical signals pass through the optical resonator in the first direction; a phase modulator configured to apply a phase modulation to optical signals that have been coupled out of the optical resonator by the second optical coupler to generate phase-modulated optical signals; an optical filter configured to filter a first portion of the phase-modulated optical signals to generate filtered, phase-modulated optical signals; wherein the second optical coupler is configured to couple a second portion of the phase-modulated optical signals into the optical resonator such that the phase-modulated optical signals propagate in a second direction through the optical resonator, wherein the first optical coupler is configured to couple the second portion of the phase-modulated optical signals out of the optical resonator after the phase-modulated optical signals pass through the optical resonator in the second direction; a relative intensity noise detector configured to convert the filtered, phase-modulated optical signals to first electrical signals indicative of a power level of the filtered, phase-modulated optical signals and relative intensity noise; a second photodetector configured to convert the phase-modulated optical signals to second electrical signals indicative of a power level of the phase-modulated optical signals after passing through the optical resonator in the second direction; and one or more circuits configured to determine a rate of rotation based on the first electrical signals and the second electrical signals.

Example 2 includes the resonator optical gyroscope of Example 1, wherein the one or more circuits are configured to lock the optical filter to the optical resonator by adjusting at least one characteristic of the optical filter.

Example 3 includes the resonator optical gyroscope of Example 2, wherein the one or more circuits are configured to adjust at temperature of the optical filter and/or modify a length of the optical filter with a piezoelectric transducer.

Example 4 includes the resonator optical gyroscope of any of Examples 1-3, wherein the optical filter is configured such that a line shape of resonance peaks of the filtered, phase-modulated optical signals is approximately equal to a line shape of resonance peaks of the phase-modulated optical signals.

Example 5 includes the resonator optical gyroscope of any of Examples 1-4, wherein the one or more circuits are configured to determine the rate of rotation based on the first electrical signals and the second electrical signals by subtracting the first electrical signals from the second electrical signals.

Example 6 includes the resonator optical gyroscope of Example 5, wherein the one or more circuits are configured to adjust a gain of the first electrical signals and/or the second electrical signals prior to subtracting the first electrical signals from the second electrical signals.

Example 7 includes the resonator optical gyroscope of Example 6, wherein the one or more circuits are configured to adjust the gain of the first electrical signals and/or the second electrical signals based on a difference between direct current power levels of the first electrical signals and the second electrical signals.

Example 8 includes the resonator optical gyroscope of any of Examples 1-7, wherein the one or more circuits are configured to lock the optical filter to the optical resonator by maximizing a direct current power level output by the relative intensity noise detector.

Example 9 includes a resonator optical gyroscope, comprising: a broadband light source configured to generate optical signals having a broadband frequency range; an optical resonator; a first optical coupler configured to receive the optical signals from the broadband light source and couple the optical signals into the optical resonator such that the optical signals propagate in a first direction through the optical resonator; a second optical coupler coupled to the optical resonator, wherein the second optical coupler is configured to couple optical signals out of the optical resonator after the optical signals pass through the optical resonator in the first direction; a phase modulator configured to apply a phase modulation to optical signals that have been coupled out of the optical resonator by the second optical coupler to generate phase-modulated optical signals; an optical resonator filter configured to filter a first portion of the phase-modulated optical signals to generate filtered, phase-modulated optical signals; wherein the second optical coupler is configured to couple a second portion of the phase-modulated optical signals into the optical resonator such that the phase-modulated optical signals propagate in a second direction through the optical resonator, wherein the first optical coupler is configured to couple the phase-modulated optical signals out of the optical resonator after the phase-modulated optical signals pass through the optical resonator in the second direction; a relative intensity noise detector configured to convert the filtered, phase-modulated optical signals to first electrical signals indicative of a power level of the filtered, phase-modulated optical signals and relative intensity noise; a second photodetector configured to convert the phase-modulated optical signals after passing through the optical resonator in the second direction to second electrical signals indicative of a power level of the phase-modulated optical signals; and one or more circuits configured to determine a rate of rotation based on the first electrical signals and the second electrical signals.

Example 10 includes the resonator optical gyroscope of Example 9, wherein the optical resonator filter has a higher finesse than the optical resonator.

Example 11 includes the resonator optical gyroscope of any of Examples 9-10, wherein the one or more circuits are configured to lock the optical resonator filter to the optical resonator by adjusting at least one characteristic of the optical resonator filter.

Example 12 includes the resonator optical gyroscope of any of Examples 9-11, wherein the optical resonator filter is configured such that a free spectral range of the optical resonator filter is an integer number times a free spectral range of the optical resonator.

Example 13 includes the resonator optical gyroscope of any of Examples 9-12, wherein the one or more circuits are configured to determine the rate of rotation based on the first electrical signals and the second electrical signals by subtracting the first electrical signals from the second electrical signals.

Example 14 includes the resonator optical gyroscope of any of Examples 9-13, wherein the one or more circuits are configured to adjust a gain of the first electrical signals and/or the second electrical signals prior to subtracting the first electrical signals from the second electrical signals.

Example 15 includes the resonator optical gyroscope of Example 14, wherein the one or more circuits are configured to adjust the gain of the first electrical signals and/or the second electrical signals prior to subtracting the first electrical signals from the second electrical signals.

Example 16 includes a method of operating a resonator optical gyroscope, comprising: generating, with a broadband light source, optical signals having a broadband frequency range; coupling, with a first optical coupler, the optical signals into an optical resonator to propagate in a first direction; coupling, with a second optical coupler, the optical signals out of the optical resonator after the optical signals pass through the optical resonator in the first direction; applying a phase modulation to the optical signals coupled out of the optical resonator by the second optical coupler to generate phase-modulated optical signals; filtering, with an optical filter, a first portion of the phase-modulated optical signals to generate filtered, phase-modulated optical signals; generating, with a relative intensity noise detector, first electrical signals indicative of a power level of the filtered, phase-modulated optical signals and relative intensity noise; coupling, with the second optical coupler, a second portion of the phase-modulated optical signals into the optical resonator to propagate in a second direction; coupling, with the first optical coupler, the phase-modulated optical signals out of the optical resonator after the phase-modulated optical signals pass through the optical resonator in the second direction; generating, with a second photodetector, second electrical signals indicative of a power level of the phase-modulated optical signals after passing through the optical resonator in the second direction; and determining a rotation rate based on the first electrical signals and the second electrical signals.

Example 17 includes the method of Example 16, further comprising locking the optical filter to the optical resonator by adjusting at least one characteristic of the optical filter.

Example 18 includes the method of any of Examples 16-17, wherein determining a rotation rate based on the first electrical signals and the second electrical signals includes subtracting the first electrical signals from the second electrical signals.

Example 19 includes the method of any of Examples 16-18, further comprising adjusting a gain of the first electrical signals and/or the second electrical signals prior to subtracting the first electrical signals from the second electrical signals.

Example 20 includes the method of any of Examples 16-19, further comprising locking the optical filter to the optical resonator such that a line shape of resonance peaks of an optical spectrum of the filtered, phase-modulated optical signals is approximately equal to a line shape of resonance peaks of an optical spectrum of the phase-modulated optical signals.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. A resonator optical gyroscope, comprising:
a broadband light source configured to generate optical signals having a broadband frequency range;
an optical resonator;
a first optical coupler configured to receive the optical signals from the broadband light source and couple the optical signals into the optical resonator such that the optical signals propagate in a first direction through the optical resonator;
a second optical coupler coupled to the optical resonator, wherein the second optical coupler is configured to couple optical signals out of the optical resonator after the optical signals pass through the optical resonator in the first direction;
a phase modulator configured to apply a phase modulation to optical signals that have been coupled out of the optical resonator by the second optical coupler to generate phase-modulated optical signals;
an optical filter configured to filter a first portion of the phase-modulated optical signals to generate filtered, phase-modulated optical signals;
wherein the second optical coupler is configured to couple a second portion of the phase-modulated optical signals into the optical resonator such that the phase-modulated optical signals propagate in a second direction through the optical resonator, wherein the first optical coupler is configured to couple the second portion of the phase-modulated optical signals out of the optical resonator after the phase-modulated optical signals pass through the optical resonator in the second direction;
a relative intensity noise detector configured to convert the filtered, phase-modulated optical signals to first electrical signals indicative of a power level of the filtered, phase-modulated optical signals and relative intensity noise;
a second photodetector configured to convert the phase-modulated optical signals to second electrical signals indicative of a power level of the phase-modulated optical signals after passing through the optical resonator in the second direction; and
one or more circuits configured to determine a rate of rotation based on the first electrical signals and the second electrical signals.

2. The resonator optical gyroscope of claim 1, wherein the one or more circuits are configured to lock the optical filter to the optical resonator by adjusting at least one characteristic of the optical filter.

3. The resonator optical gyroscope of claim 2, wherein the one or more circuits are configured to adjust at temperature of the optical filter and/or modify a length of the optical filter with a piezoelectric transducer.

4. The resonator optical gyroscope of claim 1, wherein the optical filter is configured such that a line shape of resonance peaks of the filtered, phase-modulated optical signals is approximately equal to a line shape of resonance peaks of the phase-modulated optical signals.

5. The resonator optical gyroscope of claim 1, wherein the one or more circuits are configured to determine the rate of rotation based on the first electrical signals and the second electrical signals by subtracting the first electrical signals from the second electrical signals.

6. The resonator optical gyroscope of claim 5, wherein the one or more circuits are configured to adjust a gain of the first electrical signals and/or the second electrical signals prior to subtracting the first electrical signals from the second electrical signals.

7. The resonator optical gyroscope of claim 6, wherein the one or more circuits are configured to adjust the gain of the first electrical signals and/or the second electrical signals based on a difference between direct current power levels of the first electrical signals and the second electrical signals.

8. The resonator optical gyroscope of claim 1, wherein the one or more circuits are configured to lock the optical filter to the optical resonator by maximizing a direct current power level output by the relative intensity noise detector.

9. A resonator optical gyroscope, comprising:
a broadband light source configured to generate optical signals having a broadband frequency range;
an optical resonator;
a first optical coupler configured to receive the optical signals from the broadband light source and couple the optical signals into the optical resonator such that the optical signals propagate in a first direction through the optical resonator;
a second optical coupler coupled to the optical resonator, wherein the second optical coupler is configured to couple optical signals out of the optical resonator after the optical signals pass through the optical resonator in the first direction;

a phase modulator configured to apply a phase modulation to optical signals that have been coupled out of the optical resonator by the second optical coupler to generate phase-modulated optical signals;

an optical resonator filter configured to filter a first portion of the phase-modulated optical signals to generate filtered, phase-modulated optical signals;

wherein the second optical coupler is configured to couple a second portion of the phase-modulated optical signals into the optical resonator such that the phase-modulated optical signals propagate in a second direction through the optical resonator, wherein the first optical coupler is configured to couple the phase-modulated optical signals out of the optical resonator after the phase-modulated optical signals pass through the optical resonator in the second direction;

a relative intensity noise detector configured to convert the filtered, phase-modulated optical signals to first electrical signals indicative of a power level of the filtered, phase-modulated optical signals and relative intensity noise;

a second photodetector configured to convert the phase-modulated optical signals after passing through the optical resonator in the second direction to second electrical signals indicative of a power level of the phase-modulated optical signals; and one or more circuits configured to determine a rate of rotation based on the first electrical signals and the second electrical signals.

10. The resonator optical gyroscope of claim 9, wherein the optical resonator filter has a higher finesse than the optical resonator.

11. The resonator optical gyroscope of claim 9, wherein the one or more circuits are configured to lock the optical resonator filter to the optical resonator by adjusting at least one characteristic of the optical resonator filter.

12. The resonator optical gyroscope of claim 9, wherein the optical resonator filter is configured such that a free spectral range of the optical resonator filter is an integer number times a free spectral range of the optical resonator.

13. The resonator optical gyroscope of claim 9, wherein the one or more circuits are configured to determine the rate of rotation based on the first electrical signals and the second electrical signals by subtracting the first electrical signals from the second electrical signals.

14. The resonator optical gyroscope of claim 9, wherein the one or more circuits are configured to adjust a gain of the first electrical signals and/or the second electrical signals prior to subtracting the first electrical signals from the second electrical signals.

15. The resonator optical gyroscope of claim 14, wherein the one or more circuits are configured to adjust the gain of the first electrical signals and/or the second electrical signals prior to subtracting the first electrical signals from the second electrical signals.

16. A method of operating a resonator optical gyroscope, comprising:

generating, with a broadband light source, optical signals having a broadband frequency range;

coupling, with a first optical coupler, the optical signals into an optical resonator to propagate in a first direction;

coupling, with a second optical coupler, the optical signals out of the optical resonator after the optical signals pass through the optical resonator in the first direction;

applying a phase modulation to the optical signals coupled out of the optical resonator by the second optical coupler to generate phase-modulated optical signals;

filtering, with an optical filter, a first portion of the phase-modulated optical signals to generate filtered, phase-modulated optical signals;

generating, with a relative intensity noise detector, first electrical signals indicative of a power level of the filtered, phase-modulated optical signals and relative intensity noise;

coupling, with the second optical coupler, a second portion of the phase-modulated optical signals into the optical resonator to propagate in a second direction;

coupling, with the first optical coupler, the phase-modulated optical signals out of the optical resonator after the phase-modulated optical signals pass through the optical resonator in the second direction;

generating, with a second photodetector, second electrical signals indicative of a power level of the phase-modulated optical signals after passing through the optical resonator in the second direction; and determining a rotation rate based on the first electrical signals and the second electrical signals.

17. The method of claim 16, further comprising locking the optical filter to the optical resonator by adjusting at least one characteristic of the optical filter.

18. The method of claim 16, wherein determining a rotation rate based on the first electrical signals and the second electrical signals includes subtracting the first electrical signals from the second electrical signals.

19. The method of claim 16, further comprising adjusting a gain of the first electrical signals and/or the second electrical signals prior to subtracting the first electrical signals from the second electrical signals.

20. The method of claim 16, further comprising locking the optical filter to the optical resonator such that a line shape of resonance peaks of an optical spectrum of the filtered, phase-modulated optical signals is approximately equal to a line shape of resonance peaks of an optical spectrum of the phase-modulated optical signals.

* * * * *